US006532714B1

United States Patent
Ferm et al.

(10) Patent No.: US 6,532,714 B1
(45) Date of Patent: *Mar. 18, 2003

(54) METHOD FOR RESTORING LOAD TRANSFER CAPABILITY

(76) Inventors: Carl A. Ferm, 19097 Supplejack Ct., Sugarland, TX (US) 77479; Ransome J. Wyman, 17435 New Hope Ave., Fountain Valley, CA (US) 92708; Paul Donald Krauss, 286 Elm, Elmhurst, IL (US) 60126; Ernest Albert Rogalla, 330 Pfingsten Rd., Northbrook, IL (US) 60062

(*) Notice: Subject to any disclaimer, the term of this patent is extended or adjusted under 35 U.S.C. 154(b) by 0 days.

This patent is subject to a terminal disclaimer.

(21) Appl. No.: 09/527,434

(22) Filed: Mar. 16, 2000

Related U.S. Application Data

(62) Division of application No. 09/042,591, filed on Mar. 16, 1998, now Pat. No. 6,052,964.

(51) Int. Cl.[7] ............................................. E04G 21/00
(52) U.S. Cl. ................. 52/742.12; 52/742.14; 52/742.15; 52/514.5; 52/393; 404/64; 404/75
(58) Field of Search .................... 52/393, 396.02, 52/514.5, 742.14, 742.15, 742.12, 514, 396.05, 396.08, 396.09, 396.1, 402; 404/47, 48, 51, 56, 64, 66, 67, 70, 74, 75, 78, 34, 41, 68, 82; 405/75

(56) References Cited

U.S. PATENT DOCUMENTS

| | | | |
|---|---|---|---|
| 1,223,045 A | * 4/1917 | Ferguson | ................. 404/56 |
| 3,581,631 A | 6/1971 | Samson | |
| 3,849,016 A | 11/1974 | Cochrane | |
| 3,915,582 A | 10/1975 | Clarke | |
| 4,147,009 A | * 4/1979 | Watry | ................. 52/742.15 |
| 4,353,666 A | * 10/1982 | Brandley | ................. 404/74 X |
| 4,453,360 A | 6/1984 | Barenberg | |
| 4,556,338 A | 12/1985 | Fahey | |
| 4,567,708 A | 2/1986 | Haekkinen | |
| 4,630,963 A | * 12/1986 | Wyman | ................. 404/264 X |
| 5,464,303 A | 11/1995 | Wells | |
| 5,476,340 A | * 12/1995 | Contrasto | ................. 404/75 |
| 5,492,431 A | * 2/1996 | Rasmussen et al. | ................. 404/75 |
| 5,660,498 A | 8/1997 | Freeman | |
| 6,052,964 A | * 4/2000 | Ferm et al. | ................. 52/742.14 |
| 6,312,541 B1 | * 11/2001 | Hemphill | ................. 156/95 |
| 6,354,760 B1 | * 3/2002 | Boxall et al. | ................. 404/56 |

OTHER PUBLICATIONS

ERES Consultants, Inc. "Techniques for Pavement Rehabilitation," May 1993, pp. 379–381, Dec. 5, 2000.

Percol Polymerics, Inc., "Percol Concrete Welder™," USA/ Dec. 1996.

* cited by examiner

Primary Examiner—Yvonne M. Horton
(74) Attorney, Agent, or Firm—Fulbright & Jaworski L.L.P.

(57) ABSTRACT

A method for restoring load transfer capability across a joint between two adjacent concrete slabs includes cutting a perpendicular to the joint and extending into each of the adjoining slabs. A generally flat joint tie is positioned in the slot before filling the slot with polymer concrete. The joint tie may have holes extending between the broad faces of the joint tie, with rounded corners, and made of fiberglass.

10 Claims, 6 Drawing Sheets

METHOD FOR RESTORING LOAD TRANSFER CAPABILITY

This is a divisional of U.S. Pat. No. 6,052,964 issued on Apr. 25, 2000 and filed on Mar. 16, 1998 as Ser. No. 09/042,591 which is incorporate herein by reference.

FIELD OF THE INVENTION

This invention relates to the restoration of concrete slabs, especially with respect to restoring load transfer capability at joints or cracks in concrete slabs.

BACKGROUND OF THE INVENTION

Concrete serves as the primary material for foundations and roadways. Unfortunately, concrete possesses several inherent drawbacks. First, concrete shrinks when it hardens which often results in cracking. Cracks may be controlled by placing joints (pre-planned cracks) in the concrete slab. Further cracks may develop over the life of the slab due to concrete's low tensile strength, shrinkage, and thermal expansions and contractions.

Joints and cracks in concrete are normally the weakest part of a concrete slab. A non-reinforced joint or crack cannot transfer loads from one slab to the next. Concrete pavements with poor load transfer often suffer from faulting at the joint. Joint faulting is a well known type of premature fatigue failure caused by the passage of traffic over transverse joints in concrete roads without sufficient load transfer. Advanced stages of faulting can lead to further cracking, crumbling, and damage of the concrete slab.

Modern pavements reduce the possibility of faulting by improving the sub-base support, including dowels to transfer loads between the slabs at the joints, and sealing the joints. Properly designed joints, along with regular maintenance programs, have made possible the construction of durable, high-quality concrete pavements that will perform well for many years.

Unfortunately, many roads designed in the past and currently used do not contain adequate design features. Many roads did not use dowels. For some of the roads with dowels the dowels have failed. Other roads have cracked under severe or unpredicted use. Many of these roads have developed faulting problems.

Faulting was originally cosmetically repaired with asphalt overlays and diamond grinding. These methods covered up or removed the fault differential, but they did not address the poor load transfers at the joints and cracks. As a result, faulting often reoccurred.

Newer concrete pavement restoration techniques attempt to address the problem of poor load transfer. Highway agencies have tried to retrofit dowels, double-V shear devices, figure-eight devices, and miniature I-beam devices to restore load transfer with some success. The problems with these techniques lie within the implanted devices and the material holding the devices in place. In these techniques, the implanted device transfers the vast majority load across the joint. These devices may fail if they are subject to unpredicted loads or are improperly placed in the encasing medium. Often it is difficult to ensure that the implanted device is properly positioned. Furthermore, many of these devices are made of material which could corrode and fail or, even worse, pose a safety hazard should one come loose. Finally, load transfer devices sometimes do not effectively bond with the material encasing it. Without bonding, the surrounding material cannot help to bear the load across the joint.

The second problem with current load transfer restoration techniques is with the material used to encase the load bearing device. The materials used often cannot effectively bear tensile loads and/or are difficult to handle in the field. Material used to encase load transfer devices include cementitious grout and polymer concretes containing polyesters, epoxy or methacrylate. These materials are designed to match the thermal expansion modulus of concrete, but cannot bear sufficient tensile loads or are not flexible enough to distribute loads throughout the material. Furthermore, these materials are too viscous to flow into narrow slots and cracks in concrete. The primary function of the filler materials is to bond the load-carrying device to the adjacent slabs and to keep the load-carrying device in place. Nothing suggests using filler material to transfer loads across concrete joints. What is needed is an improved method of restoring or improving load transfer across joints in concrete pavement.

SUMMARY OF THE INVENTION

The present invention improves load transfer between two adjoining slabs by cutting a slot perpendicular to the joint between the two slabs, and integrally filling the slot and joint with polymer concrete. The present invention may be performed with other steps, including removing excess material such as filler material, rubble, and dust from the slot and joint after cutting the slot, drying the slot and joint, using aggregate in the slots and joints to improve the characteristics of the polymer concrete, and cutting a joint slot generally along the joint or crack to remove the excess material from the joint slot and fill the joint and slot with polymer concrete.

It is a further object of this invention to improve the load transfer capabilities of the polymer concrete in the slots by placing a joint tie in the slot and encasing it in polymer concrete. The joint tie should extend into the portions of the slots defined by the cuts into the two adjoining slabs. The joint tie may be a fiberglass reinforced plastic tie containing a hole or a pattern of holes or slots through which polymer concrete can flow and interlock with the joint tie.

It is a further object of this invention to locate the slot in areas of normal tire travel where the majority of the load experienced by a road slab is felt.

It is a further object of this invention to use disclosed method for transverse joints, horizontal joints, cracks or any other place in any type of concrete slab that has lost its ability to effectively transfer load over a particular area.

It is a further object of this invention to use a high strength, flexible, and low viscosity polymer concrete to bear the load transfer across a joint. The polymer concrete may contain surfactants with isocyanate reactive sites, low viscosity plasticizers, and polymerization accelerating catalysts.

BRIEF DESCRIPTION OF THE DRAWINGS

The novel features believed characteristic of the invention are set forth in the claims. However, the invention itself, the preferred mode of use, further objects and advantages thereof, will best be understood by reference to the following detailed description of illustrative embodiments when read in conjunction with the accompanying drawings, wherein:

DETAILED DESCRIPTION OF THE INVENTION

The invention in its simplest form consists of cutting a slot across a joint or crack and then integrally filling the slot and the joint or crack with an polymer concrete which is able to transfer load from one slab to the other.

Figure 1:
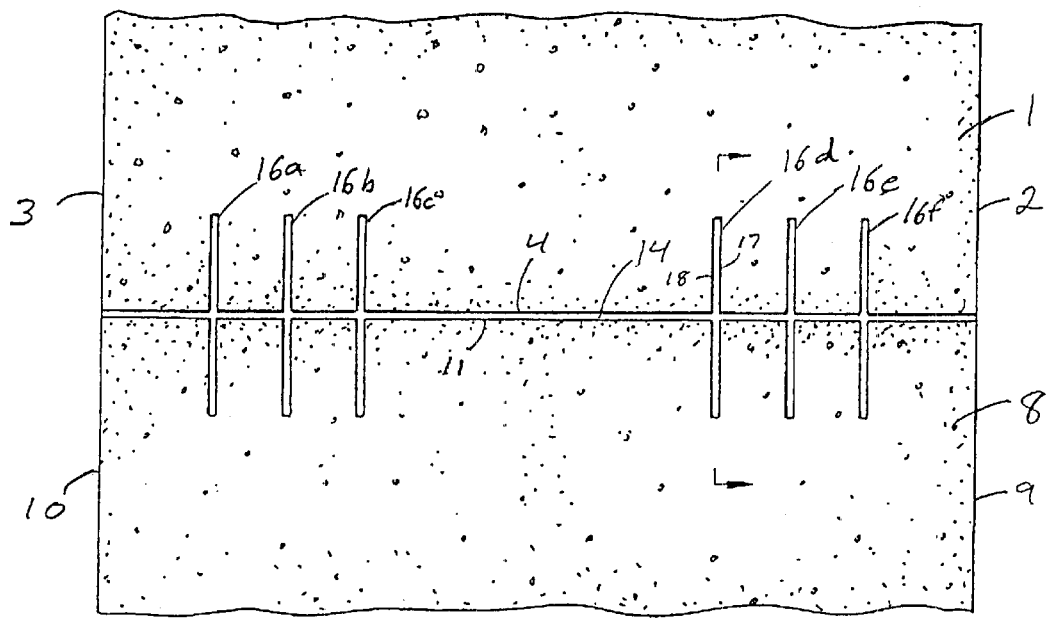
FIG. 1 depicts a top view of two partial concrete slabs with slots cut in accordance with the invention.
Figure 2:
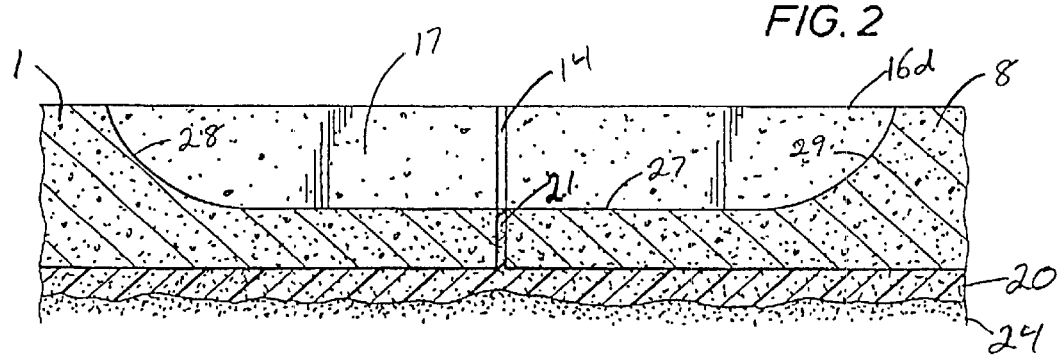
FIG. 2 depicts a cut-away view of a slot from FIG. 1.

FIGS. 1 and 2 illustrate how the slots needed for the invention are cut. Slots 16a–16f are cut generally perpendicular to transverse joint groove 14. Transverse joint groove 14 is formed by joint edge 4 of slab 1 and joint edge 11 of slab 8. Transverse joint groove 4 typically extends from slab side edges 3 and 10 to slab side edges 2 and 9 and extends downward to base 20. Slots 16a–16f are cut so that approximately half of each slot is cut into slab 1 and half into slab 8.

The slots may be of varying sizes and shapes. Using slot 16d as an example, each slot has curved end 28 and 29 resulting from the circular saw used to cut slot 16d. The shape of slot 16d is determined in part by the method used to cut the slot and may be of varying shapes. The slots as used in the invention may be of varying widths, depths and lengths. Slots are typically narrow, over half the depth of the slab, and long.

In one embodiment, the slots are between ½ inch to 3 inches wide, 6 inches deep in a 9 inch slab, and 36 inches long at the top of the slot and 18 inches long at mid-slab depth.

Slots 16a–16d may be cut in any way known to the art, including using the more common circular diamond-saw or a modified milling machine. In diamond-saw slot cutting, multiple saw cuts are made to form the edges of the slots. The diamond-saw cutting usually leaves fins in between the saw cuts that must be removed in any way known to the art, for example, with a 30-pound, hand-held jackhammer. A modified milling machine creates a slot in one pass and does not leave behind fins.

The most effective slot pattern is to concentrate the slots on the wheel paths of the roadway. As seen in FIG. 1, slots 16a–16c and 16d–16f are cut along the left and right wheel paths, respectively, of the lane formed by slabs 1 and 8. Most current dowel retrofitting methods utilize three slots per wheel path. However, one of the advantages of the present invention is the superior tensile and deflection strength of the invention versus conventional dowels. In tests, the preferred polymer concrete with fiberglass tie has a superior tensile and deflection strength in comparison to rebar dowels in grout. The increased strength means that less slots may be cut per wheel path than traditional dowel retrofitting methods. When less slots are used, then the expenses of restoring load transfer is reduced, and roads are closed for a shorter period of time to traffic.

Once the slots are cut, they must be prepared. If diamond-saw cutting is used, then the fins must be removed. Also, it is often desirable to flatten the bottom of the slots much like slot bottom 27. Slots may be flattened using a small hammerhead bit mounted on a light jackhammer to remove rock and stubble from the slot bottom 27. Rock and stubble can prevent joint ties used in the slot from sitting level and create a non-uniform layer of polymer concrete. However, a smooth slot bottom 27 is not as critical in the success of the load transfer capabilities as it is with other methods such as retrofitting dowels. Improperly placed dowels can result in pavement lockup or dowel socketing. Pavement lockup can occur when the joint or crack cannot open and close properly with temperature changes. Dowel socketing is the widening of the dowel hole which results in loss of load transfer. The disadvantages from pavement lockup and the possibility of dowel socketing are reduced or eliminated by the current invention.

Material in transverse joint groove 14 should be removed. The method for cleaning transverse joint groove 14 will be determined in part on what is in the groove. Available methods include using a diamond-saw, light jackhammer, or other tool.

Once the slot 16d is flattened, and the bulk of the material in transverse joint groove 14 removed, then slot 16d and transverse joint groove 14 should be cleaned to improve the bonding ability of the polymer concrete to joint ends 4 and 11 of slabs 1 and 8, respectively, and side walls 17 and 18 of slot 16d. Cleaning is typically accomplished by sandblasting the sides and bottom of the slot and then airblasting them. Other methods known in the art may also be utilized. A slot is usually considered clean if it does not feel dusty to the touch. Once the slot is clean, it should be dry to improve bonding of the polymer concrete to the concrete.

Dowel retrofitting techniques usually require caulking of the joint or crack on the bottom and sides of the slot to keep patching material from entering the slot. The patching material used for dowel retrofitting can cause point bearing stresses when the joint or crack closes, causing spalling and possible failure. The present invention distinguishes itself over the prior art by integrally filling the slot and the joint or crack with polymer concrete. The polymer concrete does not create significant point bearing stresses. The addition of polymer concrete to the slot or crack improves the overall strength, durability and load transfer of the present inventive method.

Once a slot is prepared, it may be filled with the load transfer material. The present invention utilizes a low viscosity, high strength, and flexible concrete polymer as the load transfer material. The preferred embodiment is a polymer concrete named Concrete Welder or Uretek 600 manufactured by Percol of Fountain Valley, Calif. The preferred polymer concrete is a two-component urethane polymer system mixed in a 1:1 ratio. One component comprises of polyether polyol, phthalate ester, organo, organo metallic catalysts and glycol with a specific gravity of 1.017, a boiling point of 464° F. and a viscosity of 24 cps at 73° F. The second component comprises of an aryl di- and polyisocyanate blend which includes diphenylmethane 4,4' diisocyanate and a diester plasticizer. Many diester plasticizers can be used including those based on alcohols and butyric, phthalic, and adipic acids. Other di- and polyisocyanates which can be used in this invention include any di- or poly-aryl isocyanate including 2,4 and 2,6 Tuloene Diisocynates. Mixed, the two components have a pot life of 60 seconds at 73° F. and a cure time of approximately 10 minutes at 73° F. Cured, the polymer concrete has a specific gravity of 1.07 (ASTM D-792), a hardness of 70 (Durometer D, ASTM D-2240), a tensile strength of 4300 psi (ASTM D-412), a less than 10% elongation at break (ASTM D-412), a tear strength of 275 (ASTM D-624), a compression strength of 4250 psi (ASTM C-39), and a bond strength to PCC of 500 psi. The invention encompasses other polymer concretes with different compositions and specific characteristics that fall within the scope of the invention.

The polymer concrete used for the present invention should have a low viscosity to completely saturate the aggregate in a narrow slot and to soak into the porous concrete through capillary action to improve the bonding between the polymer concrete and the sides of the slots. Narrower slots minimize the effect of the different rates of thermal expansion between the polymer concrete and the adjoining concrete, thereby minimizing the resulting stresses. Better bonds allow for better load transfer between the concrete and the polymer concrete. A viscosity of less than 200 centipoises is recommended. Viscosity may be lowered by using low molecular weight materials for the polymer concrete or by adding low viscosity plasticizers.

The preferred polymer concrete also exhibits high flexibility and high tensile strength. The high tensile strength is needed to withstand the loads applied to the load transfer material. However, the flexibility allows the material to transfer the load over a greater area of the load transfer material. The bond between the load transfer material and the concrete allows that load to be transferred in turn to the concrete. The flexibility also reduces stresses from thermal expansion since the material will deform somewhat under compression.

Surfactants and/or wetting agents (completely water soluble chemicals) such as ethanolamine, diethanolamine, triethanolamine, isopropanolamine, diiso propanolamine, triisopropanolamine, ethylene glycol, diethyleneglycol, and polyethylene glycols may be added to the polymer concrete to improve its adhesion to the concrete sides of the slots. These surfactants are of a special type that have isocyanate reactive sites. The surfactants wet the surface then become part of the backbone of the polymer. Thus, they provide wetting, but become immobilized by polymerization so that it cannot be dissolved by water since it has performed its function. The polymer concrete should have a bonding strength between approximately 350 to 500 psi.

Cross linkers such as Quadrol, glycerine, trimethylolpropane, and low molecular weight polypropylene triols and catalysts such as Tin, Bismuth, Mercury, Lead, and Iron polymerization catalysts, as well as tertiary amine catalysts such as triethylene diamine also may be added to reduce the moisture sensitivity of the mixture. The cross linkers and catalysts accelerate the reaction speed of polymerization. The rapid curing reduces the effect of wet surfaces on the polymer concrete.

The polymer concrete has profound improved results when used with aggregate such as sand in the slot. The aggregate can be placed in the slot before, during or after the polymer concrete is placed in the slot to cure. One embodiment uses a dry 12/20 graded rounded sand as a filler. The sand creates a rough texture which forms a mechanical bond with the side of the concrete slots and helps to transfer load from the load transfer material to the concrete. Other suitable aggregates may be used within the scope of the invention. The effective shear strength of the polymer and aggregate combination should be at least 500 psi, and preferably above 1,000 psi.

The polymer concrete may be mechanically placed into the slot with any of the suitable and known polymer injectors after the components of the polymer have been mixed. The aggregate sand may be placed in the slot before or during the injection of the polymer. The sand should substantially fill the slot with the polymer creating the bond between the sand particles. One advantage of the preferred polymer concrete is that the aggregate and the polymer are placed into the slot in two separate steps. Because the aggregate and the polymer are not mixed until they reach their final destination, the polymer may have a rate of polymerization up to 10 times faster or more than filler materials mixed before placement. With the faster reaction time, the cure time will be shorter and the polymer concrete will be less sensitive to temperature. Therefore, roads may be closed for shorter periods of time and worked on in broader temperature ranges. The pre-placed aggregate also minimizes operator skill in applying the polymer concrete because the material is not significantly effected by outside factors due to its fast rate of polymerization.

Figure 3:
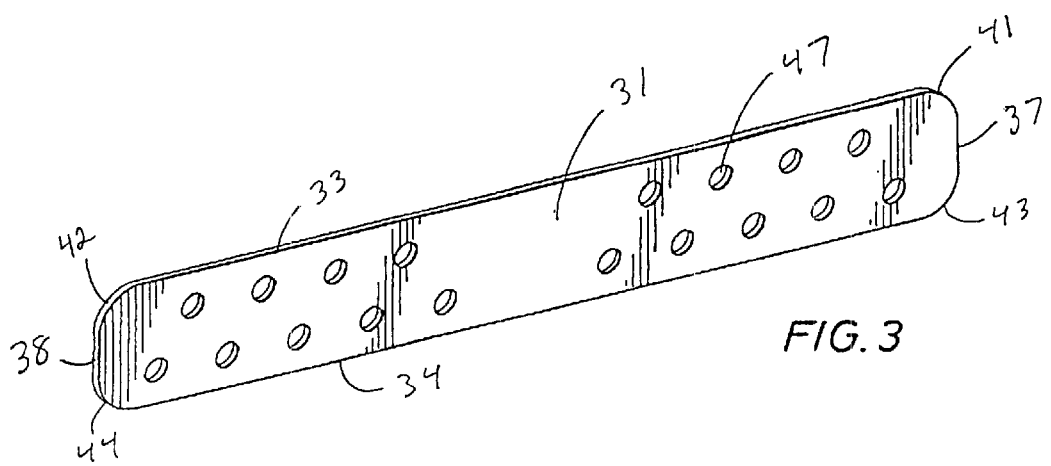
FIG. 3 depicts a joint tie.
Figure 4:
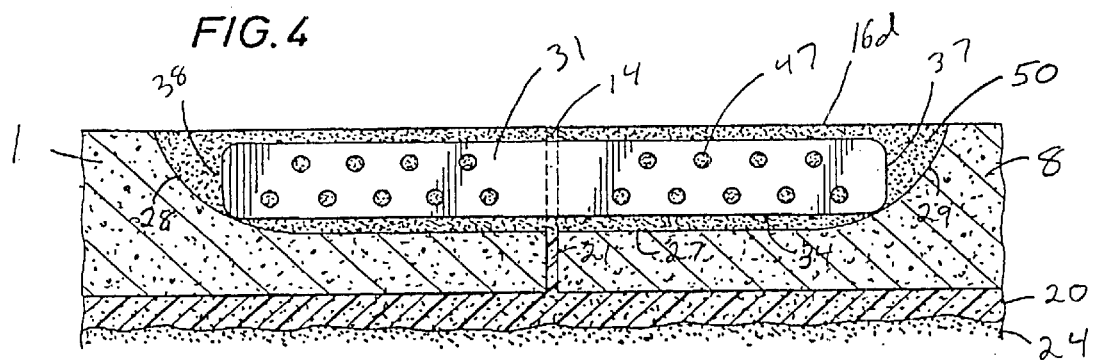
FIG. 4 depicts FIG. 2 at a later stage of the claimed invention.
Figure 5:
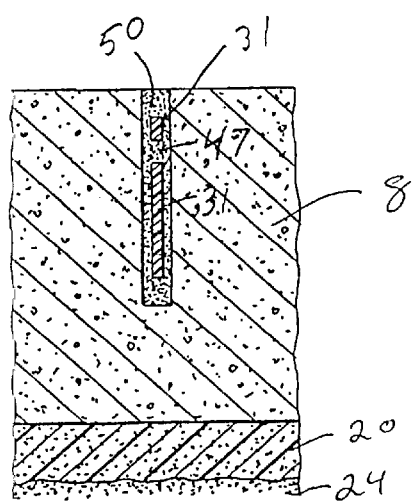
FIG. 5 depicts a cut-away view of FIG. 4 at a hole in the joint tie.

In addition to the polymer concrete, a joint tie may be used to help transfer the load along with the polymer concrete. Any joint tie may be used within the scope of the invention, but a joint tie that is able to work in harmony with the polymer concrete is preferred. For example, joint tie 31 shown in FIGS. 3 through 5 is a fiberglass reenforced plastic joint tie. Joint tie 31 has a narrow top edge 33 and bottom edge 34 to fit into slot 16d. The comers at joint tie 31 are rounded at top comers 42 and 41 of ends 38 and 37, respectively. Likewise, bottom corners 44 and 43 of ends 38 and 37, respectively are also rounded. The rounded corners will reduce the risk of tire blowout in the unlikely event that joint tie 31 comes loose out of slot 16d during the life of the pavement. Joint tie 31 may also have holes such as hole 47 which allows polymer concrete 50 to penetrate and lock joint tie 31 in position within slot 16d after polymer concrete 50 has cured. The polymer concrete 50 in hole 47 also helps to transfer loads between joint tie 31 and polymer concrete 50. The hole pattern is staggered in a preferred embodiment to increase the strength of joint tie 31 by improving stress distribution in the tie. In a preferred embodiment, holes are not placed in the middle section of joint tie 31 because the greatest shear forces are at this location. The material of joint tie 31 forms a chemical bond with polymer concrete 50 which improves the load transfer between joint tie 31 and polymer concrete 50.

Joint tie 31 should be placed in slot 16d before polymer concrete 50 is poured into slot 16d. If an aggregate is used, then joint tie 31 may be properly fixed in position in slot 16d. Joint tie 31 should be placed so that it overlaps into both slabs 1 and 8, preferably equally overlapping into each slab. Joint tie 31 may be placed at various depths within slot 16d, but the preferred position is to center joint tie 31 in slot 16d.

Figure 6:
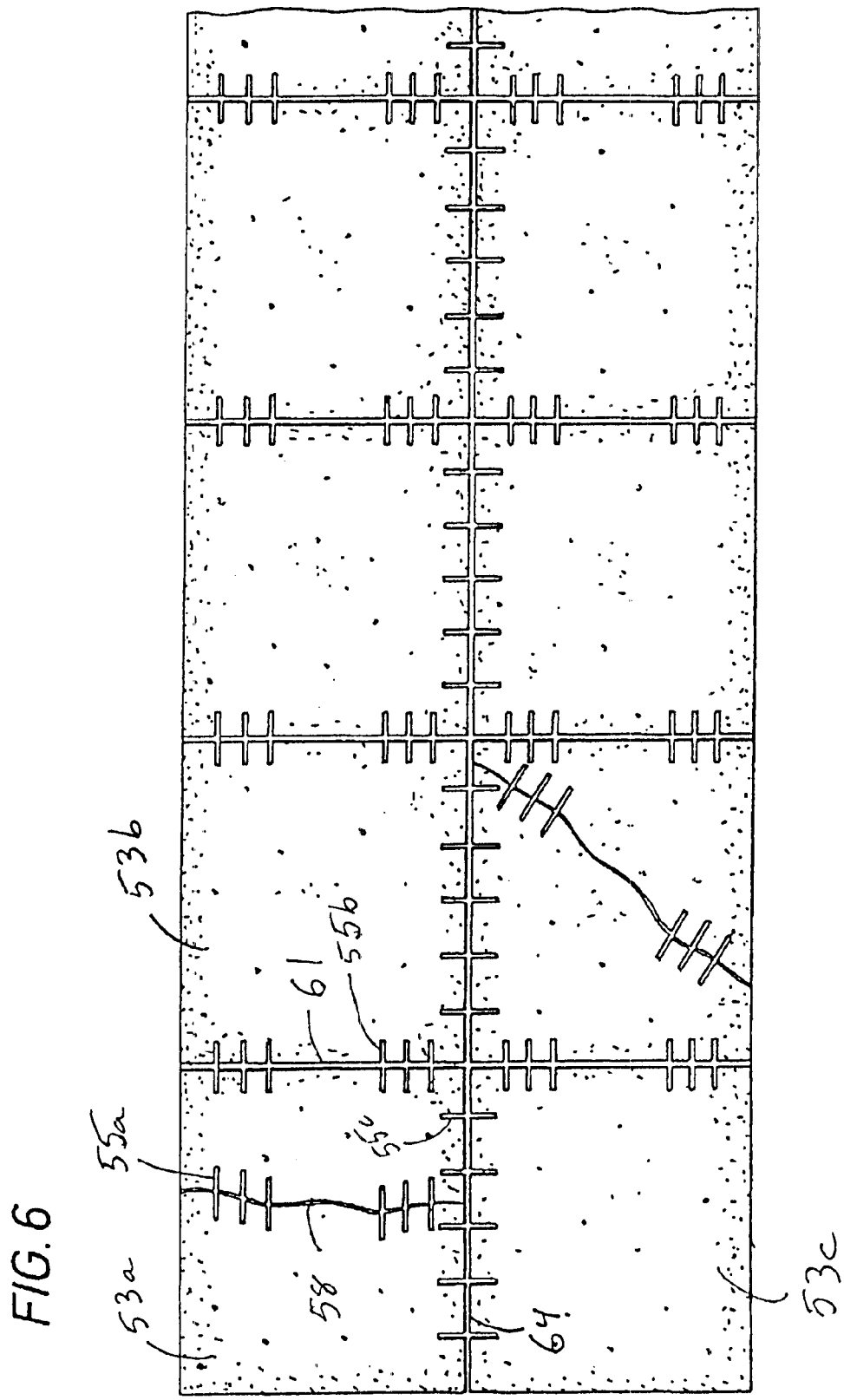
FIG. 6 depicts a top view of the two lanes of concrete highway illustrating the many uses of the current invention.

FIG. 6 illustrates the numerous places on a concrete roadway that the present invention may be used. As described earlier, the present invention may be used to restore load transfer between slabs 53a and 53b at the transverse joint 61 with polymer concrete filled slots such as filled slot 55b. The present invention may also be used to restore load transfer across crack 58 with filled slot 55a. A crack for the purposes of this invention is the same as any other joint, except that it was not planned. A crack, like any other non-reinforced joint, cannot adequately transfer loads and is subject to faulting over time. The load transfer capabilities of crack 58 is restored much in the same way as transverse joint 61. A diamond-saw may be needed to open crack 58 wide enough to fill with polymer concrete and to remove excess material in crack 58. The present invention may also be used to restore load transfer between slabs 53a and 53c at horizontal joint groove 64 with polymer concrete filled slots such as filled slot 55c. Since vehicles do not travel over horizontal joint grooves in their typical wheel paths, the filled slots at the horizontal joint groove may be evenly spaced. The number and spacing of filled slots along a horizontal joint groove will depend on the experienced loads and condition of the roadway. For example, five polymer concrete filled slots may be used to tie two 15 foot slabs together under specific circumstances.

Figure 7:
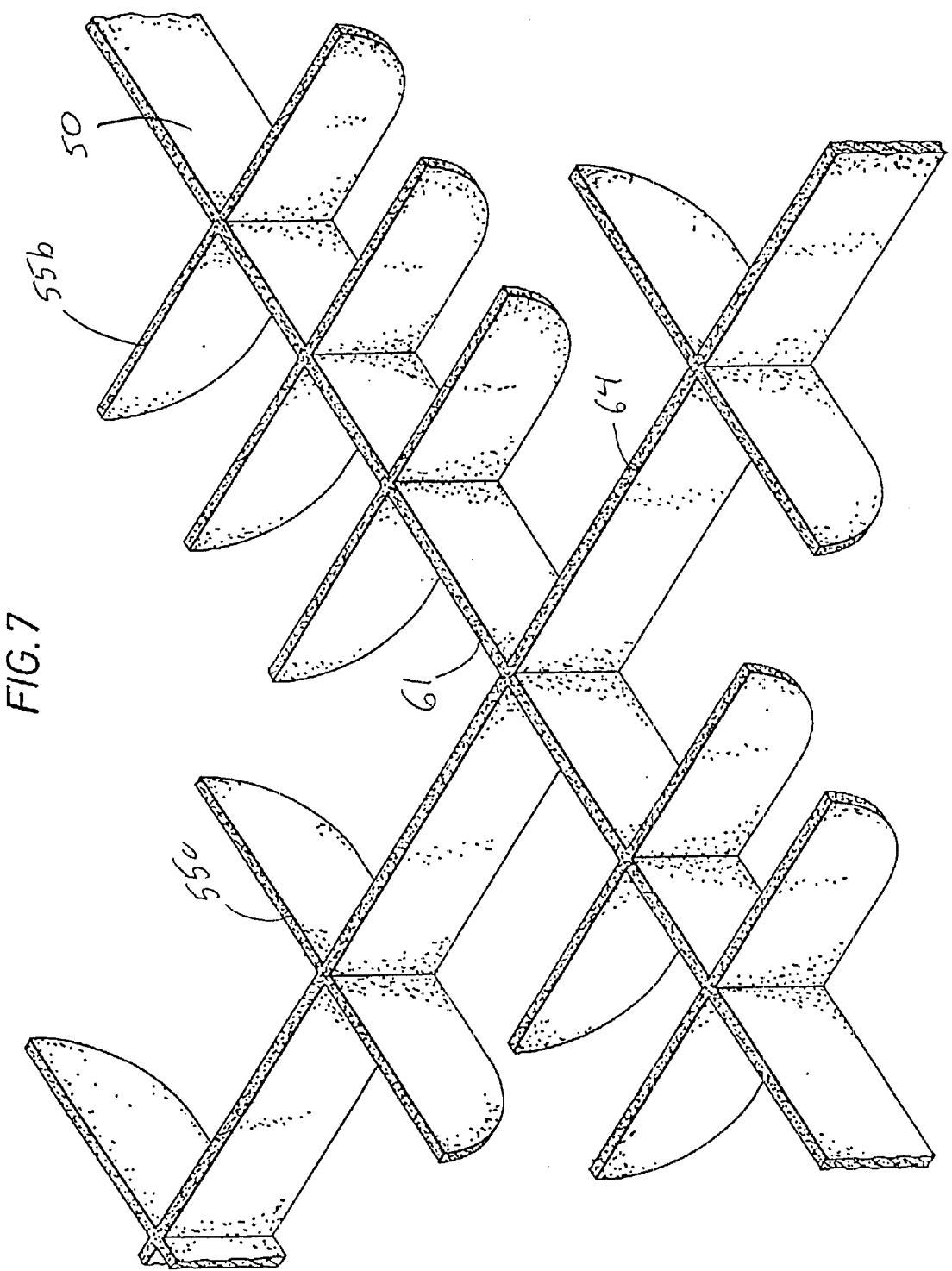
FIG. 7 depicts a perspective view of integrally poured polymer concrete in various joints and slots in accordance with the present invention.

FIG. 7 illustrates the integral polymer concrete connecting various slots and joints with the surrounding concrete cut away. The integral structure includes the polymer concrete 50 from transverse joint groove 61, filled slot 55b, horizontal joint groove 64 and filled slot 55. The integral structure helps distribute transfer loads and increases the overall strength of the structure.

Many joints in need of load transfer restoration have already begun to fault. If the concrete has faulted, then the fault should be eliminated before the load transfer is restored with the present invention. Several methods are employed in the art to deal with faults, but the preferred method is to inject expandable polyurethane foam under sunken or faulted concrete to lift, level and stabilize the concrete. Such method is further explained in U.S. Pat. No. 4,567,708. Even if the slabs at the joint do not show signs of faulting, it is preferred to stabilize the base with the expandable polyurethane foam mentioned above. Base 20 of slabs 1 and 8 in FIG. 1 has been stabilized with injected polyurethane. Sub-base 24 is the original aggregate sub-base used to support slabs 1 and 8. Injected polyurethane also fills and seals lower portion 21 of joint 14.

Figure 8:
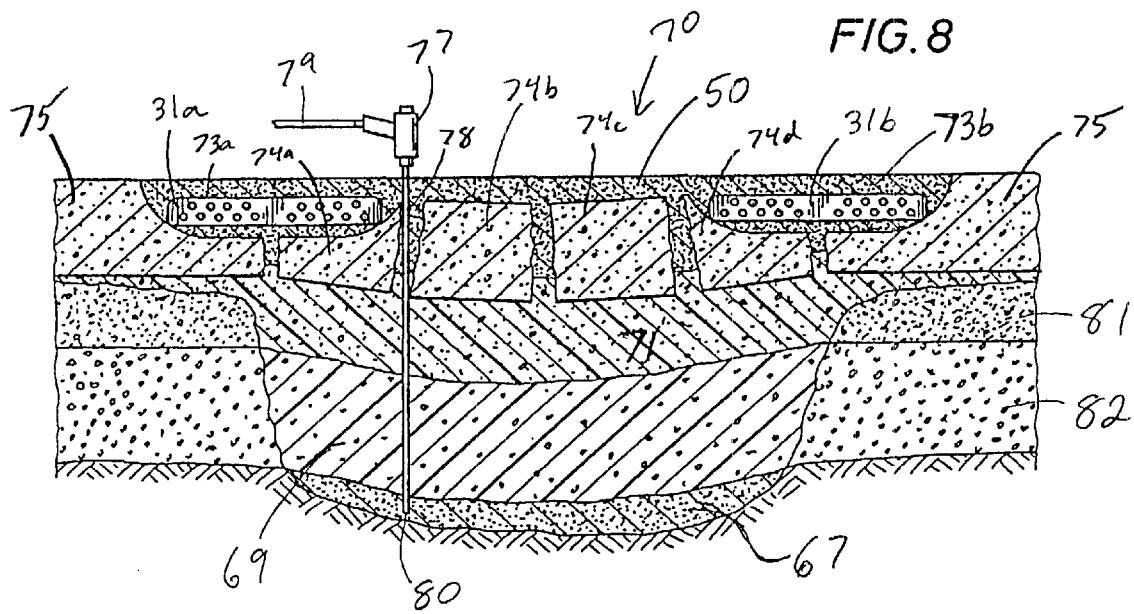
FIG. 8 depicts a side perspective of the present invention as applied to potholes.
Figure 9:
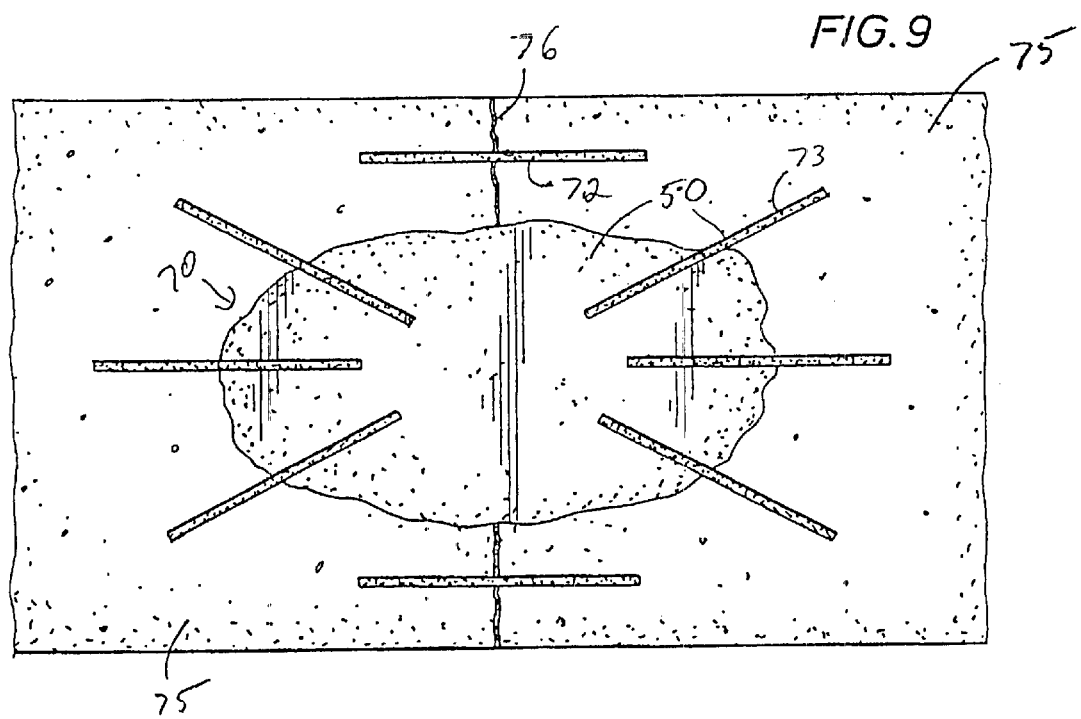
FIG. 9 depicts a top view of the present invention as applied to potholes.
Figure 10:
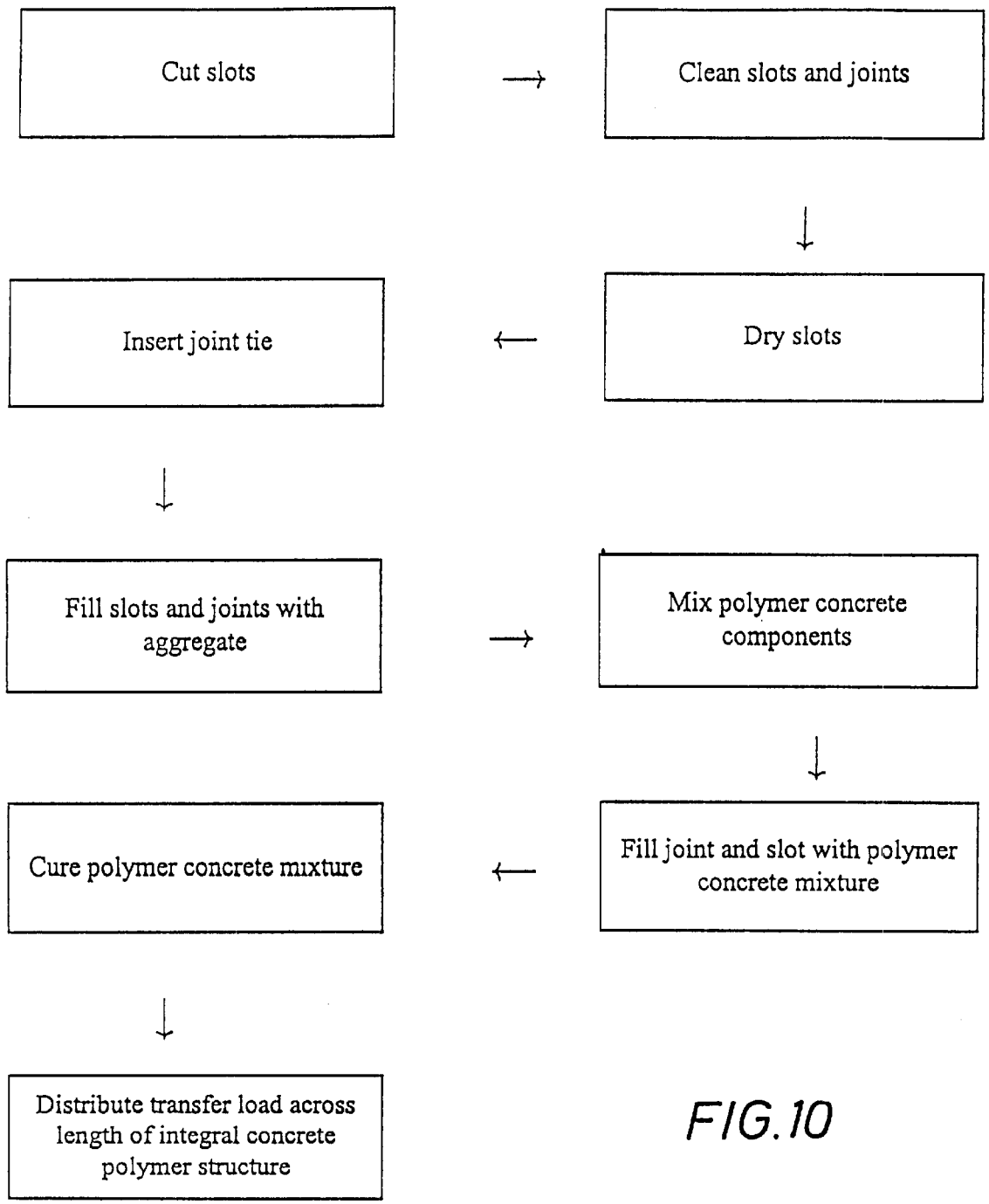
FIG. 10 depicts a labeled representation of the steps of an embodiment of the present invention.

The present invention may also be used to restore load transfer over pothole 70 in FIGS. 8 and 9. Joint ties 31a and 31b are placed in slots 73a and 73b to transfer load from unbroken concrete 75 to broken concrete pieces 74a and 74d, respectfully. Polymer concrete 50 is used not only to fill slot 73a and 73b, but also to encase broken concrete pieces 74a through 74d. Polymer concrete 50 along with joint ties 31a and 31b effectively transfer load across pothole 70 and to unbroken concrete 75.

The base support of pothole 70 may be improved before restoring load transfer capabilities to pothole 70. As shown in FIG. 8, one method of improving the base support is to inject expandable polyurethane foam 67 into any deep voids under pothole 70. Expandable polyurethane may also be injected into base 81 and sub-base 82 to form a stronger polyurethane and base mixture 71 and polyurethane and sub-base 69. The expandable polyurethane foam may be injected in much the same way as described in U.S. Pat. No. 4,567,708 with hose 79 carrying expandable polyurethane components to gun 77 to inject through tubing 80. Foam injection using water blown foams creates mold pressure and lifting.

For applications where lifting is not desired since the pavement is already to grade, only support and sealing from water intrusion is necessary. A foam that satisfies this requirement is made by blending nitrogen or carbon dioxide gas with a urethane polymer mixture comprised of polyols with polyisocyanates by blending with a high speed mechanical mixer under pressure. The mix also contains foam stabilizers and catalysts known to those familiar with the art. The mixture is injected under the slab where it expands because of the lower pressures. Pre-expanded polyurethane foams, with no residual expansion capability, may also be used for such void filling. This method may also lift some of the original broken concrete pieces 74a through 74d toward their original positions.

As seen in FIG. 9, pothole 70 can have load transfer restored through polymer concrete 50 filling pothole 70 and slots such as slot 73. Polymer concrete 50 also serves to smooth out the top surface of pothole 70. Polymer concrete slots may also be used to restore load transfer capabilities across cracks extending from pothole 70, such as with slot 72 across crack 76.

Although the invention has been described with reference to a specific embodiment, this description is not meant to be construed in a limiting sense. Various modifications of the disclosure as well as alternative embodiments of the invention will become apparent to persons skilled in the art upon reference to the description of the invention. It is therefore contemplated that the appended claims will cover any such modifications or embodiments that fall within the true scope of the invention.

We claim:

1. A method for improving transference of a load from a first slab adjacent to a second slab across a joint between the first and second slabs, comprising the steps of:

providing a slot generally perpendicular to the joint and extending into the first and second slabs, the slot consisting of a depth, length and width, the depth and length of the slot each being greater than the width, the slot having two sidewalls facing each other and extending the length and depth of the slot;

positioning a joint tie in the slot, the joint tie having a front face, a rear face, a bottom edge, a top edge and two side edges, each face having a surface area larger than the surface area of any of the edges, the joint tie being positioned with the front and rear faces generally parallel to the side walls of the slot; and filling the slot containing the joint tie with polymer concrete.

2. The method of claim, 1, further comprising the step of providing holes extending through the joint tie between the front and rear faces.

3. The method of claim 2, further comprising the step of filling the holes in the joint tie with polymer concrete while filling the slot with polymer concrete.

4. The method of claim 1, wherein the joint tie has corners on the front and rear faces, further comprising the step of rounding the corners of the joint tie.

5. The method of claim 1, further comprising the step of providing the joint tie made of fiberglass.

6. The method of claim 1, further comprising the step of mixing components of the polymer concrete in a static mixture.

7. The method of claim 6, further comprising the step of adding surfactants with isocyanate reactive sites to the polymer concrete.

8. The method of claim 6, further comprising the step of adding low viscosity plasticizers to the polymer concrete.

9. The method of claim 6, further comprising the step of adding polymerization accelerating catalysts to the polymer concrete.

10. The method of claim 1, further comprising the step of integrally filling the slot and the joint with polymer concrete.

* * * * *